Figure 1:
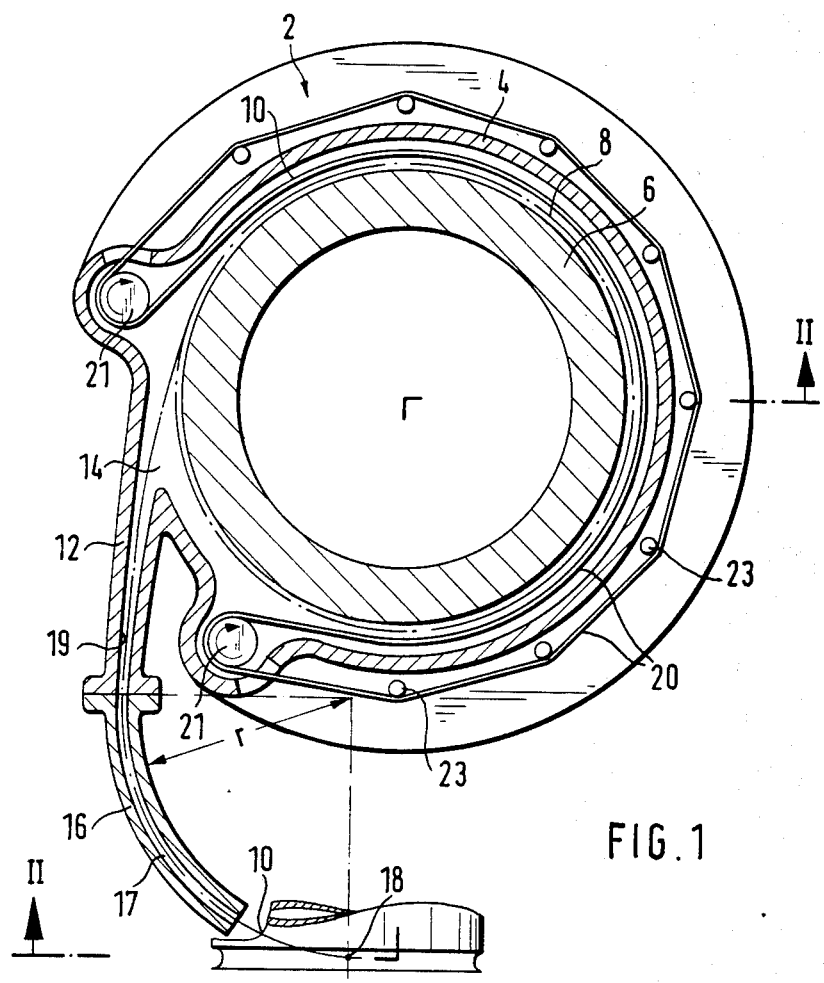

United States Patent [19]

Schröder et al.

[11] Patent Number: 4,531,682
[45] Date of Patent: Jul. 30, 1985

[54] APPARATUS FOR FEEDING A WIRE FROM A COIL TO A PROCESSING STATION

[75] Inventors: Günter Schröder, Wetter; Rudolf Eichhorn, Beckingen; Heinolf Schrader, Bruchhausen-Vilsen, all of Fed. Rep. of Germany

[73] Assignee: Deutche Gesellschaft fur Wiederaufarbeitung von Kernrennstoffen GmbH, Fed. Rep. of Germany

[21] Appl. No.: 662,017

[22] Filed: Oct. 18, 1984

Related U.S. Application Data

[63] Continuation of Ser. No. 461,676, Jan. 27, 1983, abandoned.

[30] Foreign Application Priority Data

Feb. 3, 1982 [DE] Fed. Rep. of Germany ....... 3203579

[51] Int. Cl.³ .................... B65H 75/00; B65H 75/12; B65H 51/20; G03B 1/56
[52] U.S. Cl. ............................... 242/54 R; 242/129; 242/157 R; 242/171
[58] Field of Search .............. 242/54 R, 55.2, 78, 242/78.6, 81, 83, 129, 157 R, 171

[56] References Cited

U.S. PATENT DOCUMENTS

| | | | |
|---|---|---|---|
| 3,054,382 | 9/1962 | Ebel | 242/54 R |
| 3,061,235 | 10/1962 | Lingle | 242/78.6 |
| 3,779,473 | 12/1973 | Edrinn | 242/54 R |
| 4,093,139 | 6/1978 | Amoretti | 242/55.2 |

FOREIGN PATENT DOCUMENTS

| | | |
|---|---|---|
| 947504 | 7/1956 | Fed. Rep. of Germany . |
| 968499 | 2/1958 | Fed. Rep. of Germany . |
| 1070309 | 5/1960 | Fed. Rep. of Germany . |

Primary Examiner—Stuart S. Levy
Assistant Examiner—Lloyd D. Doigan
Attorney, Agent, or Firm—Allegretti, Newitt, Witcoff & McAndrews, Ltd.

[57] ABSTRACT

Apparatus is described for feeding a wire from a wire coil to a processing station. When wire is taken from a coil and fed to a processing station, because of the tension imposed on the wire, the wire end carries out uncontrolled movements which in arc welding are known as "pig-tailing" effects. In order to obviate such uncontrolled movements of the wire after issuing from conventional guide means, in the present wire guide apparatus the wire is guided with a radius of curvature r which is equal to the radius of curvature which the cylindrical spring formed by the cylindrically wound wire has in its relaxed state. The wire guide apparatus comprises a guide tube which is joined tangentially to the coil housing and which is constructed with a slightly curved shape. Connected to the guide tube is a mouthpiece which has a curved tubular duct the radius of curvature of which is equal to the radius of curvature r. The outer diameter of the cylindrical reel on which the wire is wound is preferably greater than the inner diameter of the relaxed cylindrical spring constituted by the wound wire.

1 Claim, 2 Drawing Figures

APPARATUS FOR FEEDING A WIRE FROM A COIL TO A PROCESSING STATION

This application is a continuation of application Ser. No. 461,676, filed Jan. 27, 1983 now abandoned.

This invention relates to apparatus for feeding a wire from a coil of wire to a processing station.

When wire is drawn from a roll or coil and fed to a working or processing station, the end of the wire carries out uncontrolled movements because of the tension to which the wire has been subjected. This is found to be disadvantageous more particularly in welding work.

In the case of automatic or semi-automatic arc welding it is usual for the welding wire to be wound on a reel and to be held on this reel with the use of constraints. The welding wire is fed to the welding station, with constraints on the wire, by means of trueing devices of many varying shapes and arrangements and with tubular or hose-like guides which always end in a metal guide element with a straight bore in which the wire is guided to the welding station. Constraining forces are always made to act on the wire in such cases.

The quality of an automatically produced weld seam clearly depends on the precision with which the welding wire is fed to the arc. Criteria for such precision are:

(1) the quantity of weld metal fed-in per unit of time, and (2) the geometric location where the welding wire melts in relation to the arc. In all known installations criterion (1) is met to a more or less satisfactory degree by manual adjustment of the speed of advance of the wire, but in dependence upon criterion (2).

In order to meet criterion (2) it is known so to use trueing apparatus to shape the welding wire which is wound on rolls or in cages, so that the wire approximates to the ideal of a straight rod. But since welding wires possess more or less marked spring-elastic properties depending upon their material and production process, it is necessary to use apparatus for trueing purposes which, owing to the forces to be introduced, is of large overall size and therefore as a rule can be used only in the case of stationary machines. In the case of small machines, such as portable orbital welding machines, trueing has usually to be dispensed with. Here the welding wire is conducted to the arc by way of a guide system of rigid or flexible tube type. There, owing to the spring-elastic properties of the wire and the constraints imposed on it, the wire issuing from the metal guide will exhibit the uncontrolled movements known as "pig-tailing". Therefore when using small orbital welding apparatus, criterion (2) can be met only by the operator watching and correcting the issuing wire. The quality of the wire issuing from the metal guide depends on his care and attentiveness when working.

A weld wire roll for automatic arc welding, with a plurality of wire electrodes which run off in parallel and are connected in parallel electrically is described in the specification of German Pat. No. 1,070,309. The individual wires are relieved of stress before they are wound, and, pre-curved to their wound-on curvature, are wound on lying side by side, or wound on to a reel the diameter of which is smaller than the wire roll which is to be produced, and the wound wire roll is then made to relax. The aim is thereby to ensure uniform and smooth run-off from the roll. If a welding wire roll of this kind is used in automatic or semi-automatic arc welding apparatus, the forces described above are exerted by the conventional devices for wire feed, with the result that in spite of the welding wire having been wound in a relaxed state the aforesaid uncontrolled movements of the welding wire end occur on issuing from the wire feed apparatus.

The specification of German Pat. No. 947,504 describes a welding wire reel for arc welding apparatus of the automatic type, from which reel the welding wire is drawn off not from the outside but from the inside. This is intended to facilitate the drawing off operation.

A welding head for automatic arc welding apparatus with a welding wire unwinding from a reel is described in the specification of German Pat. No. 968,496. The welding wire is constrainedly guided in an arcuate manner in a welding head, maintaining the spring preload which was given to it during winding-on. A feed apparatus feeds the welding wire via a mouthpiece to the welding station.

In both the latter apparatus (German Pat. No. 947,504 and German Pat. No. 968,496) no measures are taken for avoiding disadvantageous uncontrolled moving of the welding wire end due to the preload forces inherent in the wire, in the region of the arc.

It is an object of the present invention to provide an improved apparatus for feeding a wire from a wire coil whereby the disadvantages described above are reduced or obviated e.g., in the case of welding apparatus.

According to the present invention there is provided apparatus for feeding a wire from a wire coil to a processing station, wherein an arcuately shaped wire guide for guiding the wire to a location of use, and wherein the wire guide has a radius of curvature r which is equal to the radius of curvature which the wire exhibits when freely unwound from the cylindrical spring form into which it was cylindrically wound in the coil.

In the use of the present apparatus the wire is fed not along a straight line or a path oscillating about a straight line but on a path with a specific curvature, free of straightening forces, to the processing station. The wire, which forms a cylindrical spring, does not undergo any permanent deformation because of the present wire guiding arrangement. The wire is guided to the processing station without straightening forces, along a path following the inherent curvature of the wire in the coil. The previously mentioned uncontrolled movement of the wire end, known as "pig-tailing", can no longer occur. The present apparatus can be used with great advantage in arc welding apparatus, more particularly in small orbital welding machines, since it is no longer necessary to carry out the corrections on the issuing welding wire end which used to be needed owing to the "pig-tailing" effect.

Figure 2:
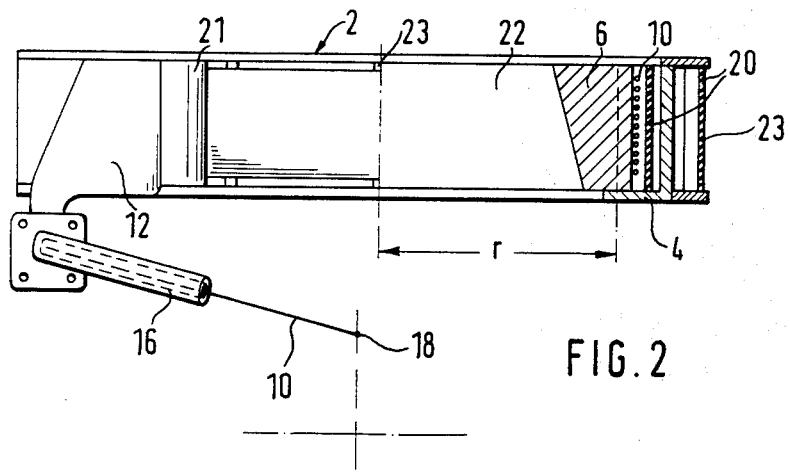

In order to enable the invention to be more readily understood, reference will now be made to the accompanying drawings, which illustrate diagrammatically and by way of example an embodiment thereof, and in which:

FIG. 1 is a section through an apparatus for feeding a wire from a wire coil to a processing station, and FIG. 2 is a view, partly in section, of the apparatus of FIG. 1 along the line II—II.

Referring now to the drawings, there is shown a wire coil unit 2 which comprises a wire winding chamber 8 between a reel 6 and a circular coil housing 4 of cup-shaped form. A wire 10 is wound to form a coil on the reel 6 arranged on the coil housing 4 is a wire guide tube 12 which extends approximately tangentially away from said housing, which can be made in one piece with the coil housing, and which communicates with the wire winding chamber 8 via an opening 14 formed in the coil housing. The guide tube 12 is made with a slightly curved shape.

Joined to the guide tube 12 is a wire mouthpiece 16 with a tubular curved guide duct 17, the mouthpiece being constructed as a curved tube. The mouthpiece 16, through which the wire 10 (for example a welding wire) can be fed to a processing station 18 (for example a welding station or a melting location), is connected releasably or fixedly to the guided tube 12. The metal mouthpiece 16 is of arcuate construction and has a radius of curvature r which corresponds to the radius of curvature of the relaxed wound wire, which forms a cylindrical spring, that is to say the mouthpiece has a radius of curvature which is equal to the radius of curvature which the wire 10 exhibits when freely unwound from the cylindrical spring form into which it is cylindrically wound in the coil. The guide tube 12 comprises a guide duct 19 the inner clear width of which, starting from the opening 14 onwards, decreases uniformly down to the inner clear width of the guide duct 17 of the mouthpiece at the end of the guide duct. Alternatively the guide duct 19 may be given a constant inner width over its entire length.

When the wire 10 is unwound, there moves in the same direction an endless elastic belt 20 which is moved by drive rollers 21 and is drawn by these against the wire 10 situated on the reel 6, said belt being returned at the outside by means of rollers 23.

The reference numeral 22 designates a pickup means for a coil drive for feeding-forward the wire 10.

The wire is wound in one or more layers on the reel 6, and, as can be seen from FIG. 2, the outer diameter r' of the cylindrical reel 6 is larger (preferably by about 2-5%) than the inner diameter of the relaxed cylindrical spring formed by the wound wire.

Because of the apparatus described above, the wire 10 is guided in such a manner to the processing point 18 in the interior of a tubular guide system 12,16, without travelling through a straightening system, that the wire 10 forming a cylindrical spring does not undergo any permanent deformation. At the end of the tubular mouthpiece 16 the wire issues free of straigthening forces, with its own curvature, and arrives with this curvature at the processing point or processing station 18, or the welding station at the electrode if the wire is a welding wire for an arc welding appliance. The uncontrolled movements of the wire end or welding wire end issuing from the guide which were mentioned in the introduction and which are known as "pig-tailing" effects, no longer occur.

Preferably the quantity of wire wound on is adapted in each particular case to a predetermined number of processing operations (welds).

The apparatus which has been described above is suitable for all wires which have to be unwound from a reel.

I claim:

1. Apparatus for feeding a welding wire from a wire coil wound on a cylindrical winding reel to a processing station, said wire coil, when removed from said reel, and in the relaxed state, forming a cylindrical spring, said reel having a diameter 2–5% larger than the diameter of said spring, said apparatus comprising
a drum-shaped housing surrounding said reel,
a guide tube through which said wire is discharged from said apparatus, said tube being tangentially connected to the periphery of said housing, and curved toward said housing with its discharge end below said housing, the radius of curvature of said tube being approximately equal to the radius of curvature of said wire in the said wire coil in the relaxed state.

* * * * *